INVENTORS
Edward F. Ream and
Lawrence H. Goto
By Fidler, Beardsley & Bradley
Attys.

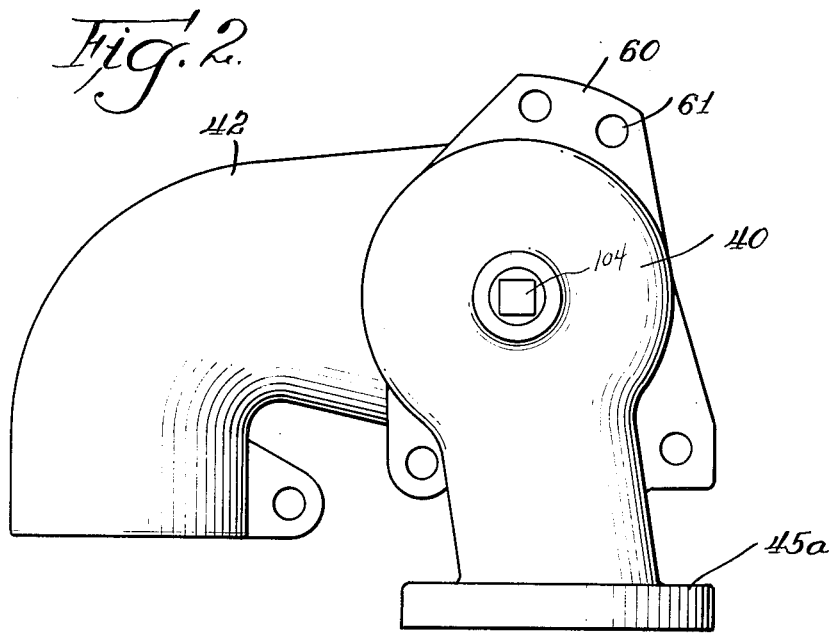
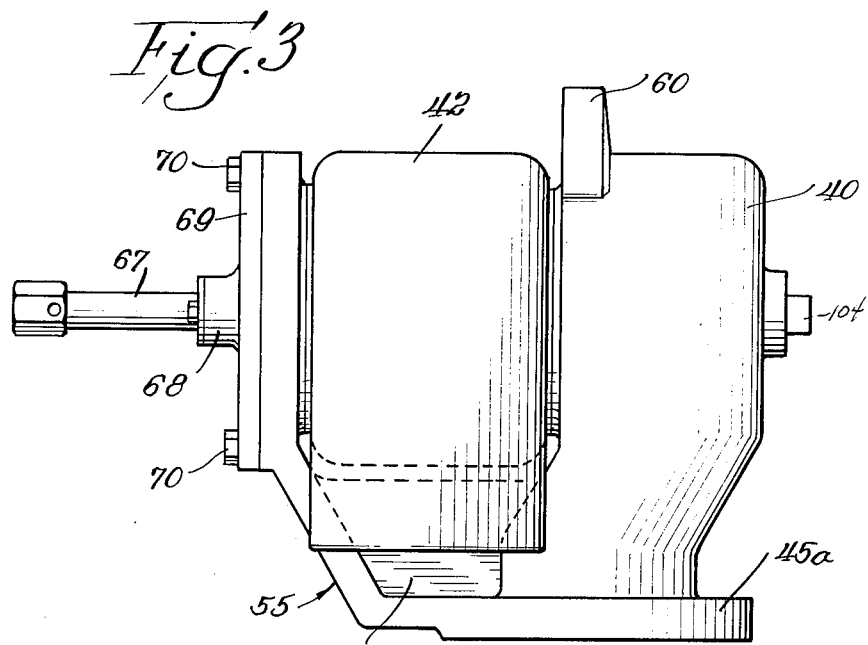

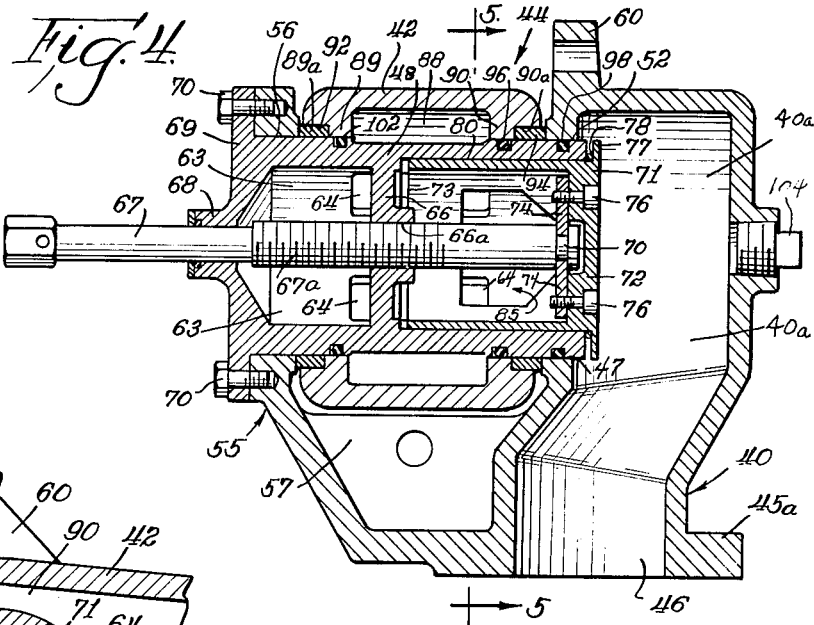
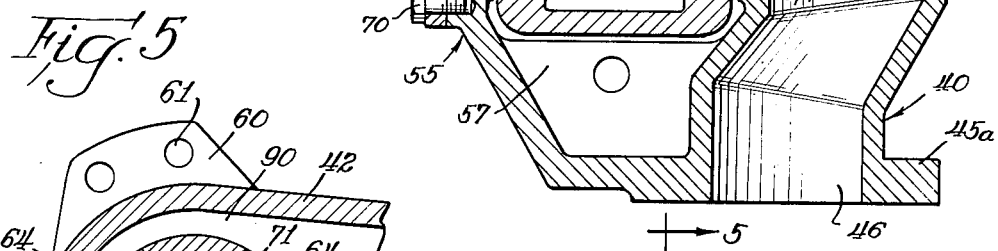
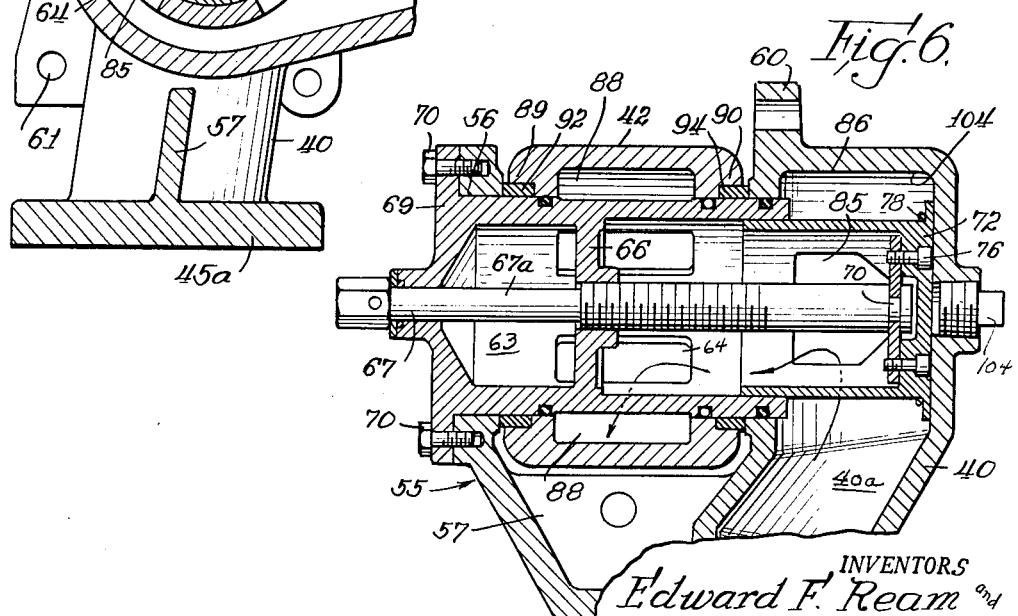

United States Patent Office 3,213,885
Patented Oct. 26, 1965

3,213,885
VALVED PIVOT JOINTS
Edward F. Ream, Lincolnwood, and Lawrence H. Goto, Roselle, Ill., assignors to Pacific Flush Tank Company, Chicago, Ill., a corporation of Illinois
Filed May 10, 1962, Ser. No. 193,777
7 Claims. (Cl. 137—615)

This invention relates to pivot joints, sometimes called "swing" joints and more particularly to a novel "swing" joint having a flow control valve incorporated therein.

Pivot joints or "swing" joints are commonly used to connect two fluid conduit elements for relative swinging or pivotal movement of at least one of the conduits. Such joints are often used in aeration equipment, such as diffusers, used in supplying air to a liquid in a tank or container, and the present invention is disclosed in connection with such use and is not limited thereto but is capable of other applications, as will be apparent from the following description.

To facilitate servicing of the aerator units or diffusers, it has been customary in the art to mount the diffusers in such a manner that they may be swung from the tank. In one prior art example of such "swinging" aerator unit, a pair of elbowed conduits are jointed by a pivot pin with one conduit being pivotally movable relative to the other conduit about the pivot pin. The joined conduits are in engagement by precisely machined facing surfaces in an attempt to render the joint between the conduits leakproof. Nevertheless the pivot pin must be pulled up very tightly against the conduits to prevent leakage at the joint between the facing surfaces of the conduits. However, experience has indicated that the pivotally movable conduit will not rotate when so tightened; in which event it has been found necessary to loosen the pivot pin prior to pivoting the pivotally movable conduit and swinging the aerator unit out of the tank. Another disadvantage inherent in the employment of such a pivot pin connected conduit arrangement is that an eccentric load is placed on the aerator unit at the pivot joint which tends to force the pivot conduits apart at the joint, thereby creating an operating condition promoting leakage at the joint. Thus, it will be appreciated that with the prior art swing joint arrangements the design parameter of pivot swinging of the pivotally movable conduit is subservient to the design parameter of rendering the unit leakproof.

It has also been customary in the prior art to employ valve means to control flow of air through the aerator unit to the diffuser outlets, such as a flat plate type seatable on an annular flat valve seat. Such a valve arrangement is generally ineffective to provide accurate control of air flow to the diffusers. The valve assemblies have generally been located in that pivot joint conduit which is stationary and in a location inaccessible for servicing and maintenance without the necessity for disassembly of the aerator unit. Moreover, the prior art aerator units employing a pivot pin were limited in conduit size and weight by the load which could be carried by the pivot pin.

With the present invention, the problems and difficulties of the prior art are subtsantially overcome by the provision of a pivot swing joint assembly in which the pivotally movable conduit is mounted for pivotal movement on a valve housing in fluid communication with both the swing or pivot conduit and the stationary conduit, the valve being readily accessible for removal thereof from the assembly without the necessity of disassembly of the other elements of the assembly for servicing and maintenance purposes.

It is, therefore, an object of the present invention to provide a new and improved pivot joint valved conduit assembly.

Another object of the present invention is to provide an improved pivot joint valved conduit assembly in which a valve housing is employed as the pivot means of one of a plurality of conduits which is pivotable about a predetermined axis of the valve housing.

Still another object of the present invention is to provide a substantially leakproof pivot joint valved conduit assembly which does not employ a pivot pin and in which one of the conduits is pivotable about a preselected axis of the other conduit.

A further object of the present invention is to provide a conduit assembly which includes a first conduit mounted for pivotal movement about a predetermined axis of a second conduit and a valve housing in fluid communication with both conduits and which is not subjected to harmful eccentric pressure loads at the pivot joint.

A still further object of the present invention is to provide a pivot joint valved conduit assembly in which one conduit is mounted for pivotal movement on valve means controlling flow through a plurality of conduits and in which the valve means is easily removed from the assembly.

Another object of the present invention is to provide a pivot joint valved conduit assembly into which one conduit is mounted for pivotal movement on a valve housing in communication with a plurality of conduits and in which the valve provides positive control of fluid flow through said conduits.

These and other objects, features and advantages of the present invention will become readily apparent from a careful consideration of the following detailed description, when considered in conjunction with the accompanying drawings, illustrating a preferred embodiment of the present invention, wherein like reference numerals and characters refer to like and corresponding parts throughout the several views, and wherein:

FIG. 2 is an enlarged view in elevation of the pivot joint assembly of FIG. 1;

FIG. 3 is a view in side elevation of the assembly of FIG. 2;

FIG. 4 is a view in vertical section of the assembly of FIG. 3 illustrating the valve of the assembly of FIG. 1 in closed position;

FIG. 5 is a view taken along line 5—5 of FIG. 4;

FIG. 6 is a fragmentary sectional view of the assembly of FIG. 4 illustrating the valve in open position.

Figure 1:
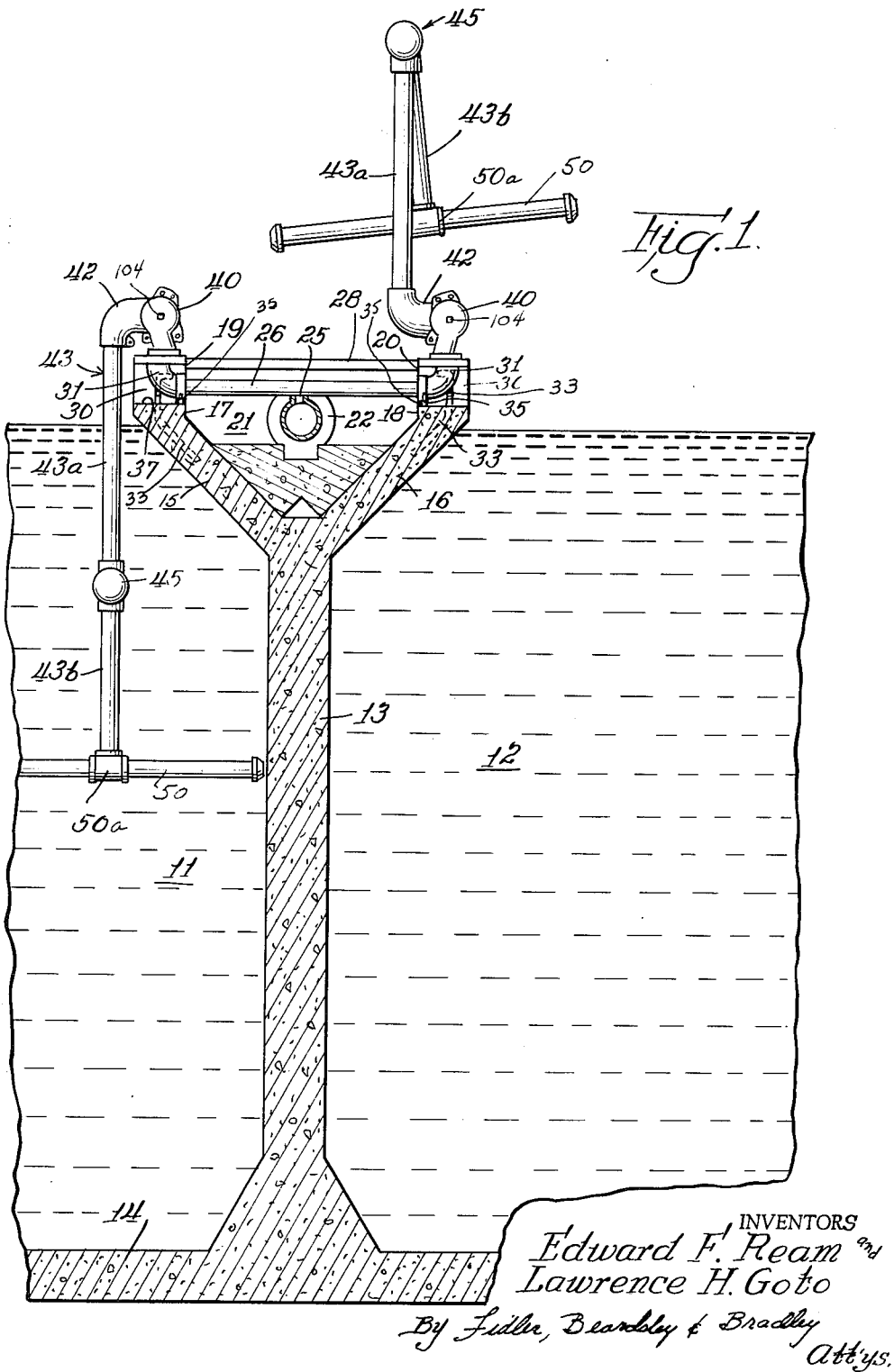
FIG. 1 is a fragmentary view in section illustrating a portion of a double chambered aeration tank employing a pivot joint valved conduit assembly constructed in accordance with this present invention.

Although the present invention has a variety of applications, a suitable environment therefor is a double chambered sewage aeration tank such as used in sewage treatment and appearing in the drawings.

Referring to FIG. 1 there is shown, in cross section, portions of a pair of aeration tanks 11 and 12 constructed of suitable material, such as concrete. The tanks 11 and 12 are separated by a vertical divider wall 13 which is supported on a common bottom wall 14 spanning the tanks 11 and 12.

Adjacent its top, the divider wall 13 takes the form of a Y having divergent branches 15 and 16 which overhang the ends of the respective tanks 11 and 12. The branches 15 and 16 terminate in vertical walls 17 and 18 having horizontally aligned facing surfaces 19 and 20.

Disposed in the space 21 between the branches 15 and 16 is a main air supply pipe 22 having a fitting 25 connected to a feeder conduit 26 extending transversely to the axis of the supply pipe 22. An additional plurality of these feeder conduits 26 (not shown) are similarly connected to the main supply pipe 22, are disposed in the space 21 of the partition 13, and are suitably connected to corresponding feeder conduits suitable for supplying air to corresponding diffusers for aerating the tanks 11 and 12 in a plurality of locations.

The feeder conduit 26 preferably lies below the level determined by the surfaces 19 and 20 and a catwalk 28 and extends into a corresponding recess 30 formed in each of the vertical walls 17 and 18 of the divider wall 13.

Each recess 30 has disposed therein an elbowed conduit 31 connected to the end of the feeder conduit 26. Support rods 33 embedded at one end in the concrete of the vertical walls 17 and 18 retain the elbow conduits 31 in predetermined alignment relative to the side walls of the recesses 30 and adjusting screws 35 carried by the elbowed conduits 31 provide means for aligning the feeder pipe 26 relative to the bottoms 37 of the recesses 30. The recesses 30 with the rods 33 and screws 35, also provide means for supporting the main air pipe 22 in a predetermined relation to the vertical walls 17 and 18 of the divider or partition wall 13.

As clearly appears in FIG. 1, the elbowed conduits 31 are each connected to a corresponding stationary or fixed conduit 40 defining an inlet supply passageway 40a (FIG. 4) which is in fluid communication with a swingable or pivoted elbowed conduit 42.

As appears in FIG. 1 each of the elbowed conduits 42 is connected to a corresponding diffuser supply pipe 43 depending therefrom and which comprises a first portion 43a and a second portion 43b which is pivotally connected as indicated at 45 to the conduit portion 43a in a known manner. The main conduit 22, the feeder conduit 26, the fixed conduits 40, the swingable conduits 42 connected to the corresponding conduits 43 comprise a flow system which is in fluid communication with a pair of diffuser heads 50 through a T connection 50a having a plurality of apertures (not shown) for supplying air to the contents of both the tanks 11 and 12.

One form of an air control pivot joint valved conduit assembly, generally indicated by the numeral 44 and constructed in accordance with the principles of the present invention, appears in FIGS. 4–6. The conduit assembly 44 includes the stationary or fixed supply conduit 40 which is flanged as at 45a for connection to the elbow conduit 31 (FIGS. 1 and 2) and which has an inlet 46 and an outlet 47 to the fluid flow passageway 40a thereof.

The pivot joint valved conduit assembly 44 includes the fixed conduit 40 which serves as a carriage or cradle support for a valve housing 48 on which is pivoted the swingable conduit 42 which feeds the diffuser 50.

The cradle support for the valve housing 48 includes a vertical bearing support arm 55 carried by fixed conduit 40 which is integral therewith and in spaced relation to the outlet 47 of fixed conduit 40. The bearing arm 55 is provided with an aperture or bore 56 which is coaxially aligned with the outlet 47 of the supply conduit 40 and which serves as a bearing support for one end of the valve housing 48. The outlet 47 serves as a second bearing support surface for the opposite end of the valve housing 48. Thus, the valve housing 48 is supported at its opposite ends in the arm 55 and in an outlet 47 of the conduit 40 so that the weight of the valve housing 48 is equally distributed between the support arm 55 and the outlet 47. The bearing arm 55 and outlet 47 of the supply conduit 40, in addition to providing a support carriage or cradle for the valve housing 48 so that the weight of the valve housing is equally distributed therebetween, serve as a trunnion mount with the valve housing 48 for the elbowed conduit 42 for limited pivotal movement thereof on the valve housing 48.

A divider rib 57 is provided to reinforce and strengthen the bearing arm 55 and, as clearly appears in FIGS. 4 and 5 an external flange 60 with apertures 61 is provided for the purpose of engaging an aperture in the elbow 42 when the assembly is raised into the upright position, as indicated in FIGURE 1. A separate pin (not shown) is inserted through the apertures to lock the hanger pipe 42a in either the vertical position or in an angular position, with the tubes 50 suspended over the tank.

The valve housing 48 defines a valve chamber 63 and is provided with a plurality of circumferentially spaced flow ports 64 communicating with the interior of swing conduit 42. A spider 66 which is integral with the valve housing 48 is disposed in the valve chamber 63 and has a threaded bore 66a therethrough axially aligned with the housing 48. The valve means disposed in chamber 63 includes a reciprocable valve stem 67 which extends through a bored boss 68 formed in an integral end plate 69 of the valve housing 48 which is secured to the bearing support arm 55 by screws 70 to retain the valve housing in fixed position relative to the arm 55. A portion of the stem 67a is in threaded engagement with the threaded bore 66a of the spider 66 for adjustment of the position of a valve head 71 in the chamber 63. At its end remote from the end plate 69 the stem 67 is provided with a retaining groove 70. The stem 67 carried a bell or open cup type valve head 71 having a closed end 72 and an open end 73. A pair of retaining members 74 are receivable in the groove 70 and secure the valve head 71 to the stem 67 as by screws 76.

The closed end 72 of the valve head 71 is provided with an external annular flange 77 against which abuts an external O-ring which is provided to seal the parting line 80 between the inner valve chamber defining surface of the valve housing 48 and the external surface of the valve head 71 when the valve head 71 is in closed position as appears in FIG. 4.

The valve head 71 is provided with a plurality of circumferentially spaced outlet ports 85 which communicate, when the valve is in the open position, as appears in FIG. 6, the passageway 40a of the fixed conduit 40 with the valve chamber 63 which is, in turn, in fluid communication through ports 64 with the inlet 88 of the passageway of the pivotable conduit 42. Thus the fixed conduit 40 is in fluid communication with the pivotable conduit 42 through the valve 71 on the housing 48 of which the conduit 42 is pivoted.

The pivotable conduit 42 is provided at each side 89 and 90 thereof with an annular recess, recesses 89a and 90a respectively, which receive a pair of graphited bronze sleeve bearing rings 92 and 94 which are maintained in the recesses 89a and 90a between the bearing support arm 55 and the portion of the conduit 40 defining the outlet 47 and the sides 89 and 90 respectively of the conduit 42. Each of the bearing rings 92 and 94 provides a permanently lubricated bearing around the valve housing 48 for the pivotable conduit 42 so arranged that the load of the conduit 42 is applied at the center of these two trunnion type bearings 92 and 94. Seal means 96, 98 and 102 prevents leakage from the spaces existing between the conduits 40 and 42 and the valve housing 48. A hole normally closed by plug 104 provides a connection for an air operated device which may use the air supply of the conduit assembly.

In operation, air is supplied through the passageway 40a of the conduit 40. When the valve is closed as appears in FIG. 4, the O-ring 78 is maintained against the valve housing 48 by the valve head flange 77 and communication between the conduits 40 and 42 through the valve housing is prevented. To open the valve and thereby communicate passageway 40a of conduit 40 with passage 88 of conduit 42 through valve chambers 63 and housing ports 64 and valve head ports 85, the stem 67 is rotated to thread the stem 67 to the right as appears in FIG. 6 until the end 72 of the valve head abuts the end wall 104 of the passageway 40a of conduit 40. The valve head 71 is now in the full-open position and the air now flows from passageway 40a of conduit 40 through valve head ports 85 into chamber 63 and from chamber 63 through ports 64 into the passage 88 of the pivotable conduit 42. It will be appreciated that to close the valve and block fluid communication between the conduits 40 and 42, the above-described procedure is reversed. It will also be appreciated that the valve head may be maintained in any intermediate position between full open and full closed position thereby providing an efficient means for controlling the flow to the tubes 50 when in operative position. Provision of a plurality of tapered ports 85 assures an accurate control or throttling of the air flowing through the valve as the valve is moved between open and closed position and vice versa.

To clean or replace the valve assembly, the screws 70 are removed and the valve housing easily removed from the cradle or carriage support arm 55 and the bearing surface of the outlet 47 of conduit 40. It will also be appreciated that the above-described fluid flow arrangement minimizes eccentric loads at the parting surfaces between the conduits 40 and 42 and valve housing 48.

When it becomes necessary to clean the diffusers 50, the conduit 42 is pivoted upwardly as appears in FIG. 1 on the bearing rings 92 and 94 without the necessity of loosening pivot pins and the like. With the particular cradle construction of the present invention which supports the valve housing at both ends thereof and by employment of the valve housing as a trunnion type bearing mount for the rings 92 and 94 which support the pivotable conduit 42, a pivot joint valved conduit assembly is provided which does not require a pivot pin and which permits utilization in such an assembly of conduits of a size and weight heretofore considered unfeasible in the art.

Although various minor modifications of the present invention will become readily apparent to those versed in the art, it should be understood that it is desired to encompass within the scope of the patent warranted hereon all such embodiments as reasonably and properly come within the scope of the contribution to the art hereby made.

We claim:

1. A pivot joint valved conduit assembly comprising: a first fluid flow conduit, a cradle including a pair of spaced apart and bored supports, the bores of said support being coaxially aligned with said first conduit, valve means including a valve housing fixedly carried in axial alignment with said first conduit by said cradle and defining a valve chamber in fluid communication with said first conduit, a second fluid flow conduit in fluid communication with said first conduit through said valve means and carried by said valve housing for pivotal movement about a preselected axis of said valve housing, and means for controlling operation of said valve means.

2. The assembly of claim 1 wherein at least one of said supports is formed integral with said first conduit.

3. The assembly of claim 1 wherein each of said supports is a sleeve support bearing and said second fluid flow conduit is disposed between said support bearings for pivotal movement.

4. A pivot joint valved conduit assembly comprising: an elbowed fluid flow conduit having an inlet portion and an outlet portion, a valve housing support carriage including a pair of spaced apart and bored support rings extending substantially parallel to the inlet portion of said elbowed conduit, the bores of said supports being co-axially aligned with the outlet portion of said first conduit, valve means including a ported valve housing axially carried by said supports and defining a valve chamber in fluid communication with said outlet portion of said first conduit, a second fluid flow conduit in fluid communication with said valve chamber through said ported valve housing and carried by said valve housing for pivotal movement about a preselected axis of said valve housing, and means for controlling operation of said valve means.

5. A pivot joint valved conduit assembly comprising: an elbowed fluid flow conduit having an inlet portion and an outlet portion, a valve housing support carriage including a pair of spaced apart and bored support rings extending substantially parallel to the inlet portion of said conduit, the bores of said support rings being co-axially aligned with the outlet portion of said elbowed conduit, a valve means including a valve housing having an open end and a closed end, the open end of said valve housing being supported in fluid communication and in axial alignment with the outlet of said elbowed conduit, and a second conduit in fluid communication with said first conduit through said valve means and carried by said valve means between said support ring for pivotal movement about a preselected axis of said valve means.

6. a pivot joint valved conduit assembly comprising a housing member defining a chamber therein and having a first and a second port opening into said chamber, an arm integral with said housing, said arm having an aperture therein spaced from and aligned with said first port, a cylindrical valve body removably secured to said housing and extending through said aperture and said first port, means for sealing said valve body to said housing around said first port, said body having a bore therein opening in the direction of said chamber, said valve body having a plurality of radial passageways disposed intermediate said aperture and said first port, a cylindrical valve member slidably mounted within said body and having a bore therein opening toward said aperture, said valve member having an imperforate wall disposed within said chamber, an annular flange on said valve member disposed in said chamber, an annular valve seat at the end of said valve member disposed in said chamber, a valve stem secured to said valve member and sealably extending through said valve body to control the relative axial positions of said valve member of said body, said valve member having a radial passageway connecting to said bore, a swingable conduit pivotally mounted on said valve body between said aperture and said first port and cooperating with said valve body to define an annular chamber surrounding said valve body and communicating with said radial passageways, and sealing means connected between said swingable conduit and said valve body on opposite sides of said annular chamber.

7. A combination pivot joint and valved connector comprising a housing having structure including a first wall defining a chamber therein and a port extending therethrough into said chamber, a second wall member extending from said housing parallel to said first wall and having a first opening therethrough, said first housing wall having an opening aligned with said first opening and connected to said chamber, valve means including a stationary member and a movable member, said movable member being mounted in said stationary member and having a valve portion cooperable with a valve seat on said stationary member, said stationary member being removably mounted in the openings in said first and second walls, said stationary member including at least one radial port controllably connected to said chamber through said valve and valve seat, a conduit member including an annular portion surrounding said stationary member between said walls for pivotal movement on said stationary member, said stationary member providing the sole support for said conduit, and means defining a passage in said annular portion in constant communication with said radial port in all positions of said conduit member relative to said stationary member.

References Cited by the Examiner

UNITED STATES PATENTS

| 169,952 | 11/75 | Brownell | 137—616.7 XR |
|---|---|---|---|
| 1,680,119 | 8/28 | Schulder | 137—615 XR |
| 2,006,029 | 6/35 | Nichols | 137—616.3 XR |
| 2,045,030 | 6/36 | Thompson. | |
| 2,953,161 | 9/60 | Muller | 137—615 |

FOREIGN PATENTS

| 713,689 | 8/31 | France. |
|---|---|---|

WILLIAM F. O'DEA, *Primary Examiner*.